United States Patent
Asayama et al.

(10) Patent No.: US 11,132,539 B2
(45) Date of Patent: Sep. 28, 2021

(54) POSTURE RECOGNITION SYSTEM, IMAGE CORRECTION METHOD, AND RECORDING MEDIUM

(71) Applicant: FUJITSU LIMITED, Kawasaki (JP)

(72) Inventors: Yoshihisa Asayama, Kawasaki (JP); Shoichi Masui, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 28 days.

(21) Appl. No.: 16/810,872

(22) Filed: Mar. 6, 2020

(65) Prior Publication Data

US 2020/0210692 A1 Jul. 2, 2020

Related U.S. Application Data (63) Continuation of application No. PCT/JP2017/035980, filed on Oct. 3, 2017.

(51) Int. Cl.
*G06K 9/00* (2006.01)
*G06K 9/62* (2006.01)

(52) U.S. Cl.
CPC ..... *G06K 9/00369* (2013.01); *G06K 9/00342* (2013.01); *G06K 9/6257* (2013.01)

(58) Field of Classification Search
CPC ........... G06K 9/00369; G06K 9/00342; G06K 9/6257
See application file for complete search history.

(56) References Cited

U.S. PATENT DOCUMENTS

| | | |
|---|---|---|
| 2010/0197390 A1 | 8/2010 | Craig et al. |
| 2012/0062749 A1 | 3/2012 | Kawahata |
| 2012/0155706 A1 | 6/2012 | Honjo et al. |
| 2012/0157207 A1 | 6/2012 | Craig et al. |

(Continued)

FOREIGN PATENT DOCUMENTS

| | | |
|---|---|---|
| JP | 2010-165183 A | 7/2010 |
| JP | 2012-059030 A | 3/2012 |

(Continued)

OTHER PUBLICATIONS

Extended European Search Report dated Aug. 19, 2020, issued in corresponding European Patent Application No. 17928075.5.

(Continued)

*Primary Examiner* — David F Dunphy
(74) *Attorney, Agent, or Firm* — Xsensus LLP (57) ABSTRACT

A posture recognition system includes a sensor and a recognition apparatus, wherein the sensor captures a distance image including information on a distance to a subject, at an angular field controlled based on the distance to the subject, and the recognition apparatus includes a memory, and a processor coupled to the memory and configured to acquire the distance image and the angular field used when the sensor captures the distance image, from the sensor, and correct the acquired distance image based on a ratio between a first resolution corresponding to another angular field used when a training distance image is captured, and a second resolution corresponding to the acquired angular field, the training distance image being used for generating a learning model which recognizes a posture of the subject.

11 Claims, 9 Drawing Sheets

(56) References Cited

U.S. PATENT DOCUMENTS

2012/0269384 A1* 10/2012 Jones ................ G06K 9/00201
382/103
2013/0336524 A1* 12/2013 Zhang ................ G06K 9/00355
382/103

FOREIGN PATENT DOCUMENTS

| JP | 2012-127819 A | 7/2012 |
|---|---|---|
| JP | 2014-142832 A | 8/2014 |

OTHER PUBLICATIONS

S Montabone et al: "A long-range depth camera with configurable field of view and resolution", The 9th International Symposium on Mobile Mapping Technology, Dec. 9, 2015 (Dec. 9, 2015), pp. 1-8, XP055333820.

Fischer Tobias et al: "Markerless Perspective Taking for Humanoid Robots in Unconstrained Environments", 2016 IEEE International Conference on Robotics and Automation (ICRA), IEEE, May 16, 2016 (May 16, 2016), pp. 3309-3316, XP032908527.

* cited by examiner

RESOLUTION: HIGH

RESOLUTION: LOW

POSTURE RECOGNITION SYSTEM, IMAGE CORRECTION METHOD, AND RECORDING MEDIUM

CROSS-REFERENCE TO RELATED APPLICATION

This application is a continuation application of International Application PCT/JP2017/035980, filed on Oct. 3, 2017 and designating the U.S., the entire contents of which are incorporated herein by reference.

FIELD

The present invention relates to a posture recognition system, an image correction program, and an image correction method.

BACKGROUND

Conventionally available is an apparatus for recognizing a posture or a movement of a person based on a distance image (hereinafter, also referred to as a depth image) output from a distance sensor (hereinafter, also referred to as a depth sensor) that measures a distance to the person. Such an apparatus assigns labels to parts of a person based on a distance image output from a distance sensor, for example. Based on the labelled parts, the apparatus extracts a skeletal model having three-dimensional skeletal positions. The apparatus then recognizes the posture or the movement of the person based on the extracted skeletal model.

The distance sensor is, for example, an apparatus referred to a laser radar apparatus or laser imaging detection and ranging (LIDAR) that measures the distance to a target of measurement using a laser beam. The distance sensor includes a floodlight unit that outputs and scans a laser beam emitted from a laser light source emitting light at a certain timing, two dimensionally using a microelectromechanical systems (MEMS) mirror, for example. The distance sensor also includes a light receiving unit that detects the light reflected on the target of measurement using a photodetector, as the floodlight unit scans the laser beam, and calculates the distance to the target of measurement, at each of the scanned position.

Because the distance sensor performs raster scan of a predetermined area that includes the target of measurement with a laser beam, for example, the interval between the sampling points (distance-measured points) that are sampled with the laser beam remains constant within the measurement area at a particular distance from the distance sensor. That is to say, the sampling density remains constant. The sampling density in the measurement area is higher when the distance of the measurement area with respect to the distance sensor is shorter, and is lower when the distance is further. In other words, the resolution of the person, that is, the sampling density changes depending on the distance of the person that is the target of measurement with respect to the distance sensor. To put it to other words, the resolution of the person becomes lower when a person becomes further away from the distance sensor.

Patent Document 1: U.S. Patent No. 2010/0197390

SUMMARY

According to an aspect of the embodiments, a posture recognition system includes a sensor and a recognition apparatus, wherein the sensor captures a distance image including information on a distance to a subject, at an angular field controlled based on the distance to the subject, and the recognition apparatus includes: a memory; and a processor coupled to the memory and configured to: acquire the distance image and the angular field used when the sensor captures the distance image, from the sensor, correct the acquired distance image based on a ratio between a first resolution corresponding to another angular field used when a training distance image is captured, and a second resolution corresponding to the acquired angular field, the training distance image being used for generating a learning model which recognizes a posture of the subject, generate a part-label image in which parts of the subject are represented by part labels, using the corrected distance image and the learning model, recognize a skeletal structure of the subject based on the part labels in the generated part-label image, and output skeletal structure information representing a posture of the subject based on the skeletal structure.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

A possible measure to this problem is to change the width of the angular range covered by the scanning laser beam based on the distance and the azimuth angle of the person with respect to the distance sensor in such a manner that the sampling density remains constant. In other words, by restricting the angular field that is the range covered by the scanning laser beam only to the surrounding of a detected person based on the distance of the person, the distance sensor is enabled to maintain the same resolution regardless of whether the distance from the distance sensor to the person is short or long. To put it to other words, it becomes possible for the distance sensor to control the resolution depending on the distance of the subject with respect to the distance sensor. The distance sensor is then enabled to capture a high-resolution distance image even when the subject is at a distance, for example. However, if the angular field is changed to control the resolution, there are times when the parts of a subject fail to be recognized using a learning model.

In one aspect, the embodiments provide a posture recognition system, an image correction program, and an image correction method capable of recognizing parts of a subject even with a distance image captured in an environment different from those where training images are captured.

One embodiment of a posture recognition system, an image correction program, and an image correction method disclosed herein will now be explained in detail with reference to the drawings. The embodiment is, however, not intended to limit the scope of the technology disclosed herein in any way. Furthermore, the embodiment described below may be combined with other embodiments as appropriate, within the scope in which the embodiments do not contradict with each other.

Embodiment

Figure 1:
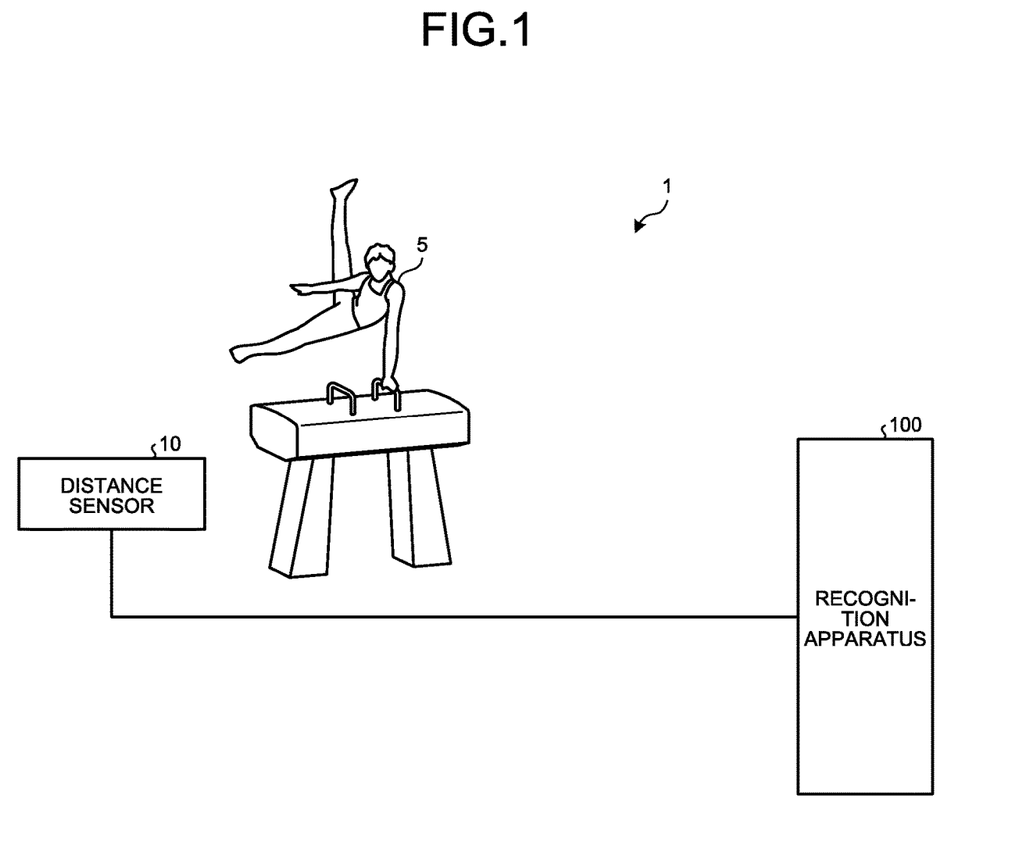
FIG. 1 is a schematic illustrating an example of a configuration of a posture recognition system according to an embodiment.

FIG. 1 is a schematic illustrating an example of a configuration of a posture recognition system according to an embodiment. This posture recognition system 1 illustrated in FIG. 1 includes a distance sensor 10 and a recognition apparatus 100. In the posture recognition system 1, the number of distance sensors 10 is not limited to any number, and the posture recognition system 1 may include any number of distance sensors 10. The distance sensor 10 and the recognition apparatus 100 are communicatively connected to each other, over the wire or wirelessly.

The posture recognition system 1 is an example of a system in which the distance sensor 10 makes a measurement of a person 5 that is a subject, and the recognition apparatus 100 recognizes the posture or the like of the person 5 based on the measurement result.

The distance sensor 10 is, for example, an apparatus referred to as a laser radar apparatus or a LIDAR that measures the distance to a target of measurement, using a laser beam. For each pixel, the distance sensor 10 measures (senses) the distance of an object using an infrared laser, for example, and outputs a distance image having a size of 320 pixels in the width direction and 200 pixels in the height direction, for example. Each pixel of the distance image contains a distance to the object. In other words, a distance image is a depth image representing the depth of a subject recognized by the distance sensor (depth sensor) 10. The distance sensor 10 also outputs an angular field used at the time of the measurement, that is, used when the distance image is captured. The distance sensor 10 measures the distance of an object (subject) that is within a distance of approximately 15 meters therefrom, for example. In this embodiment, the object is the person 5. The distance sensor 10 may also be configured to output a distance image having a size of 200 pixels in the width direction and 320 pixels in the height direction, by rotating the direction in which the distance sensor 10 is installed by 90 degrees, for example. In other words, the distance sensor 10 includes an imaging unit the angular field of which can be controlled depending on the distance to the person 5 that is a subject, and that captures a distance image containing the information on the distance to the subject. The distance sensor 10 also includes a communicating unit that transmits the angular field used in capturing the distance image, and the captured distance image to the recognition apparatus 100.

Figure 2:
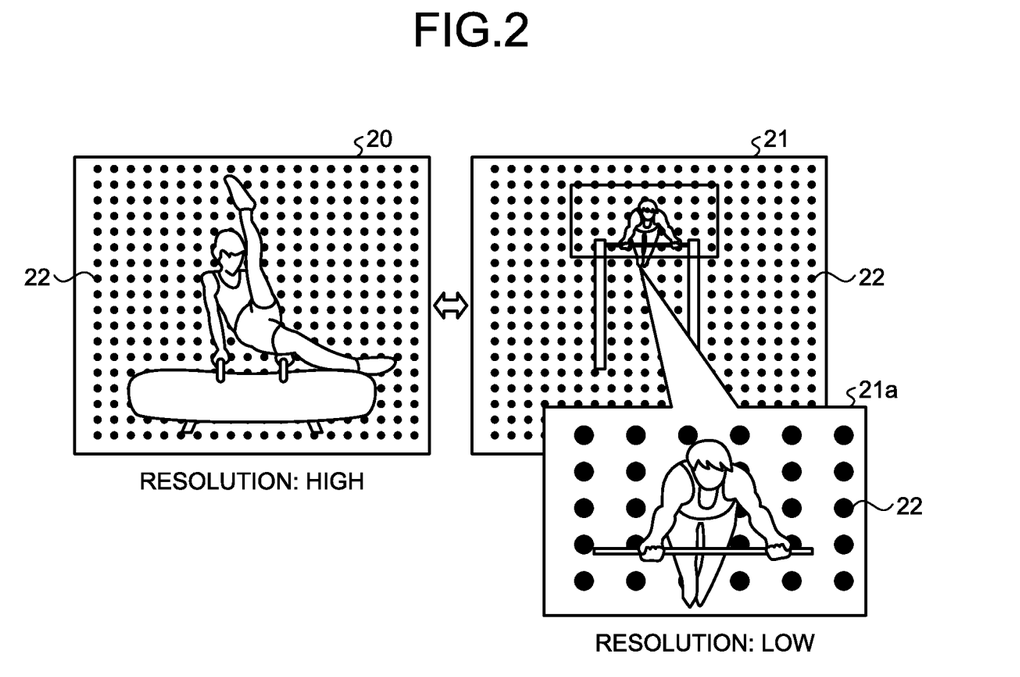
FIG. 2 is a schematic illustrating an example in which the resolution of a person changes depending on distances.

The angular field and the resolution of the distance sensor 10 will now be explained with reference to FIGS. 2 to 4. FIG. 2 is a schematic illustrating an example in which the resolution of a person changes depending on distances. To explain using an example of gymnastics events, as illustrated in distance images 20, 21 in FIG. 2, for example, the distance to a person that is a subject changes depending on events. The number of sampling points 22 is the same between the distance image 20 and the distance image 21. However, the number of sampling points in the area corresponding to the person is different between the distance image 20 and the distance image 21, as illustrated as a distance image 21a that is an enlargement of the distance image 21 near the person. In other words, the person in the distance image 20 is represented in a higher resolution, but the person in the distance image 21 is represented in a lower resolution. When a person is represented in a lower resolution, there are times when a problem occurs in recognizing the parts or the posture of the person.

Figure 3:
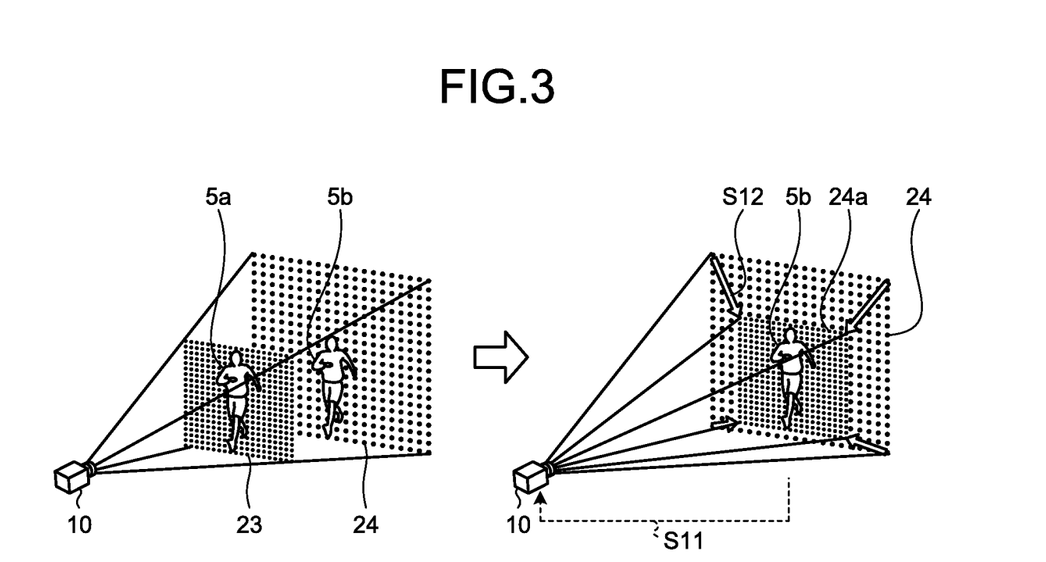
FIG. 3 is a schematic illustrating an example in which the angular field of laser beams is controlled based on the distances.

FIG. 3 is a schematic illustrating an example in which the angular field of laser beams is controlled based on distances. As illustrated in FIG. 3, assuming that the same angular field is used for a distance image 23 corresponding to a person 5a positioned nearer to the distance sensor 10, and for a distance image 24 corresponding to a person 5b positioned further away from the distance sensor 10, the person 5b is represented in a lower resolution. To address this issue, upon detecting the person 5b (Step S11), the distance sensor 10 performs the control to reduce the angular field based on the distance (Step S12), and captures a distance image 24a having the same resolution as the resolution of the person 5a in the distance image 23. For example, the distance sensor 10 performs the control to set the angular field to 36 degrees in the width direction, and to 28 degrees in the height direction, at the distance where the distance image 23 is captured. At the distance where the distance image 24a is captured, by contrast, the distance sensor 10 performs the control to set the angular field to 18 degrees in the width direction and 14 degrees in the height direction, for example. In other words, the distance sensor 10 changes the angular field over time, based on the distance to the subject. In this manner, the distance sensor 10 can maintain the same resolution regardless of whether the distance to the subject is short or long.

Figure 4:
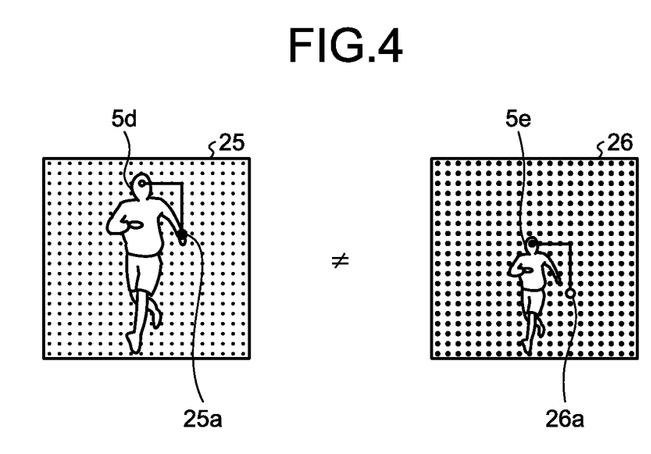
FIG. 4 is a schematic illustrating an example of how parts are recognized differently when the angular field is different.

FIG. 4 is a schematic illustrating an example of how parts are recognized differently when the angular field is different. With the angular field control illustrated in FIG. 3, while it is possible to maintain the same resolution even if the distance of the subject with respect to the distance sensor 10 changes, if the angular field is changed, the angular resolution in the resultant distance image also changes accordingly. For example, assuming that a distance image 25 and a distance image 26 illustrated in FIG. 4 are distance images captured with different angular fields, when the part recognition is performed using a classifier, there are times when recognition results acquired from a person 5d and a person 5e become different. For example, let us assume herein that there is a left arm at a pixel 25a positioned four pixels to the right and five pixels down from the pixel having the head of the person 5d, and there is a background at a pixel 26a positioned four pixels to the right and five pixels down from the pixel having the head of the person 5e. In such a case, part labels that are the result of recognizing the parts become different between the distance image 25 and the distance image 26, even if used are classifiers using the same learning model. In the manner described above, if the captured distance image has an angular field that is different from that of the distance image with which the learning model is trained, a recognition rate of the part recognition deteriorates.

Returning to the explanation of FIG. 1, the distance sensor 10 captures a distance image containing information on the distance to the subject, at the angular field controlled based on the distance of the person 5 that is the subject. The recognition apparatus 100 acquires the distance image and the angular field used when the distance sensor 10 captured the distance image, from the distance sensor 10. The recognition apparatus 100 also corrects the acquired distance image based on a ratio between a first resolution corresponding to the angular field used when the training distance image is captured, and a second resolution corresponding to the acquired angular field, where the training distance image is a distance image with which the learning model that is used in the subject posture recognition process is trained. The recognition apparatus 100 generates a part-label image in which parts of the subject are represented by part labels, using the corrected distance image and the learning model. The recognition apparatus 100 also recognizes a skeletal structure of the subject based on the part labels assigned in the generated part-label image, and outputs the skeletal structure information representing the posture of the subject. In this manner, the posture recognition system 1 can recognize the parts of a subject in an environment different from those where training images are captured.

Figure 5:
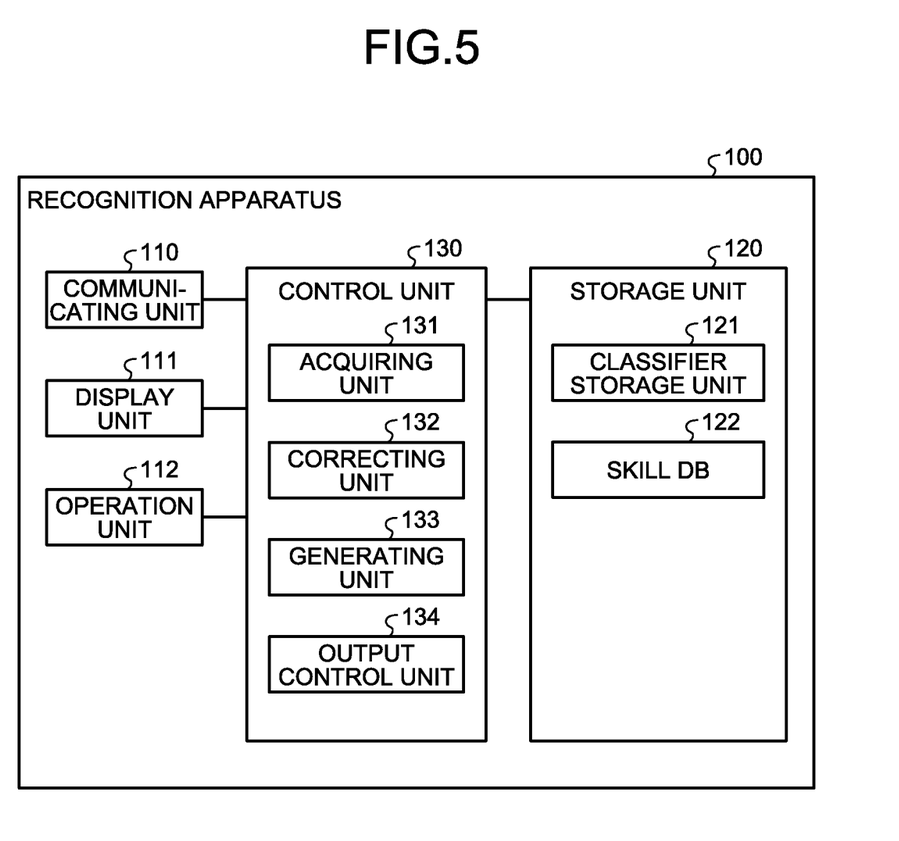
FIG. 5 is a block diagram illustrating an example of a configuration of a recognition apparatus according to the embodiment.

A functional configuration of the recognition apparatus 100 will now be explained with reference to FIG. 5. FIG. 5 is a block diagram illustrating an example of a configuration of the recognition apparatus according to the embodiment. As illustrated in FIG. 5, the recognition apparatus 100 includes a communicating unit 110, a display unit 111, an operation unit 112, a storage unit 120, and a control unit 130. In addition to the functional units illustrated in FIG. 5, the recognition apparatus 100 may include various functional units provided to a known computer, or those of various types of input devices or sound output devices, for example. As one example of the recognition apparatus 100, a portable personal computer may be used. Without limitation to the portable personal computer, a desktop personal computer may also be used as the recognition apparatus 100.

The communicating unit 110 is implemented as a network interface card (NIC), for example. The communicating unit 110 is a communication interface that is connected to the distance sensor 10 over the wire or wirelessly, and that governs the exchange of information with the distance sensor 10.

The display unit 111 is a display device for displaying various information. The display unit 111 is implemented as a display device such as a liquid crystal display. The display unit 111 displays various screens such as a display screen input from the control unit 130.

The operation unit 112 is an input device that receives various operations performed by a user of the recognition apparatus 100. The operation unit 112 is implemented as an input device such as a keyboard and a mouse. The operation unit 112 outputs operations entered by a user to the control unit 130 as operation information. The operation unit 112 may be implemented as an input device such as a touch panel, and the input device of the operation unit 112 may be integrated with the display device of the display unit 111.

The storage unit 120 is implemented as a random-access memory (RAM), a semiconductor memory device such as a flash memory, or a storage device such as a hard disk or an optical disc, for example. The storage unit 120 includes a classifier storage unit 121 and a skill database 122. The storage unit 120 stores therein information used in a process performed by the control unit 130. In the explanation hereunder, a database is sometimes shortened as a DB.

The classifier storage unit 121 stores therein a learning model used to acquire a part-label image from a distance image. In other words, the classifier storage unit 121 is an example of a multi-class classifier (hereinafter, referred to as a classifier) used to acquire a part-label image from a distance image. The classifier storage unit 121 stores therein an angular field used when a distance image with which a learning model is trained is captured, in a manner associated with the learning model (classifier). The classifier storage unit 121 may also be configured to store therein a distance image, and information on positions of the joints of a person (skeletal structure dictionary information) as the learning model. The information on the joint positions of a person is skeletal structure information for representing the posture of a subject. The learning model (classifier) in the classifier storage unit 121 is generated by executing machine learning with various types of distance images. At this time, as the algorithm of the machine learning, a random forest or deep learning may be used, for example. The distance images with which the machine learning is carried out may include, not only the distance images that are actually captured, but also distance images of the subjects generated using three-dimensional computer graphics (CG).

The skill DB 122 stores therein skeletal structure information representing the posture of a subject, in a manner associated with a gymnastic skill and a score, for example. The skill DB 122 stores therein skills of different gymnastics events such as pommel horse, still rings, and vault, and the technical scores assigned thereto, in a manner associated with the skeletal structure information.

The control unit 130 is implemented by causing a central processing unit (CPU) or a micro processing unit (MPU), for example, to execute a computer program stored in the internal storage device, using a RAM as a working area, for example. The control unit 130 may also be implemented as an integrated circuit such as an application specific integrated circuit (ASIC) or a field programmable gate array (FPGA).

The control unit 130 includes an acquiring unit 131, a correcting unit 132, a generating unit 133, and an output control unit 134, and implements or executes information processing functions or actions to be explained below. In other words, these processing units of the control unit 130 execute a recognition process. The internal configuration of the control unit 130 is not limited to the configuration illustrated in FIG. 5, and may be another configuration as long as the information processing to be described later is executed.

The acquiring unit 131 receives and acquires the angular field and the distance image from the distance sensor 10 via the communicating unit 110. The acquiring unit 131 outputs the acquired angular field and distance image to the correcting unit 132.

In other words, the acquiring unit 131 acquires a second distance image to be subjected to a recognition process using a learning model that is based on a first distance image, and that contains the information on the distance of the subject with respect to the distance sensor 10, and an angular field of the distance sensor 10 used when the second distance image is captured.

When the angular field and the distance image are received from the acquiring unit 131, the correcting unit 132 performs a pre-process to the distance image. The correcting unit 132 performs noise removal and background removal as the pre-process. The correcting unit 132 removes noise from the distance image by performing smoothing such as moving-averaging, for example. The correcting unit 132 then removes objects in the background from the distance image having noise removed, based on a distance image having been captured in advance in the absence of the person 5 that is a subject, that is, based on background information.

Once the pre-process of the distance image is completed, the correcting unit 132 refers to the classifier storage unit 121, and acquires the angular field used when the distance image for training the learning model is captured. The correcting unit 132 calculates a first angular resolution (first resolution) based on the acquired angular field used when the training distance image is captured. The angular resolution can be calculated by dividing the angular field by the number of pixels in the width direction or the height direction.

The correcting unit 132 calculates a second angular resolution (second resolution) based on the angular field of the acquired distance image. The correcting unit 132 then determines whether the calculated first angular resolution and second angular resolution are different. If it is determined that the first angular resolution and the second angular resolution match, the correcting unit 132 outputs the distance image to the generating unit 133 without performing any correction.

If it is determined that the first angular resolution and the second angular resolution are different, the correcting unit 132 calculates the amount by which a Z value is to be corrected in the acquired distance image. The Z value herein means, among conversions of the distance information contained in the distance image into the values in the x, y, and z coordinate axes of the Cartesian coordinate system, a value in the z axis that is the direction extending from the distance sensor 10 toward the subject. Among the entire pixels of the acquired distance image, the correcting unit 132 corrects the Z value at the pixels containing the distance information by the calculated amount of correction. The amount of correction is an amount for matching the second angular resolution in one of the width direction and the height direction, to the first angular resolution in the same direction, where the one of the width direction and the height direction is a direction in which the absolute value of the difference between the first angular resolution of the training distance image and the second angular resolution of the distance image is greater.

Figure 6:
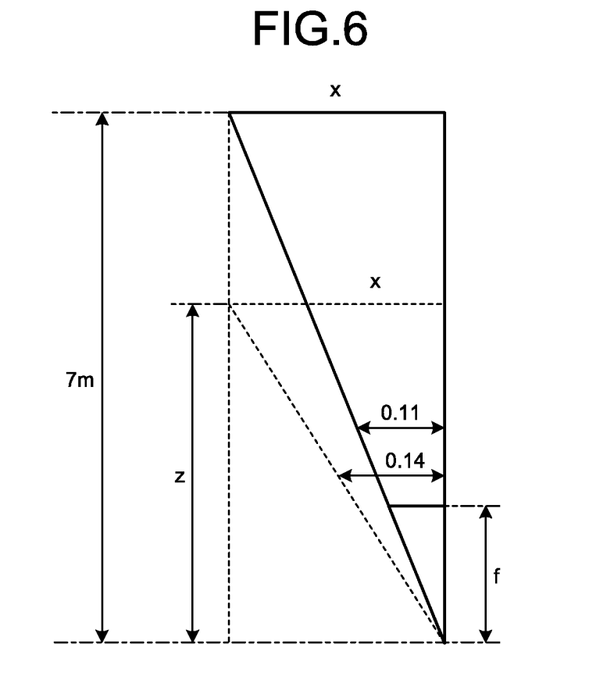
FIG. 6 is a schematic illustrating an example of a relation between a Z value and angular resolutions.

The Z value correction will now be explained with reference to FIGS. 6 and 7. FIG. 6 is a schematic illustrating an example of a relation between a Z value and an angular resolution. As illustrated in FIG. 6, let us now assume that the width-direction value used when the image of the subject is captured (in x-axis direction) is x, the value in the Z-axis direction is 7 meters (7000 millimeters), and the second angular resolution is 0.11. In order to correct this distance image to 0.14 that is the first angular resolution of the training captured image, z is calculated using the width direction value of the subject after the correction as x, the Z-axis direction value after the correction as z, and denoting the first angular resolution as 0.14. This calculation follows Equations (1) to (6) below. In these equations, f denotes the focal distance.

$$x:7000=0.11:f \quad (1)$$

$$x=(7000\times 0.11)/f \quad (2)$$

$$x:z=0.14:f \quad (3)$$

$$z=(x\times f)/0.14 \quad (4)$$

$$z=(((7000\times 0.11)/f)\times f)/0.14 \quad (5)$$

$$z=(7000\times 0.11)/0.14 \quad (6)$$

In other words, the Z value after the correction can be expressed as Equation (7) below:

$$\text{Z value after correction}=(\text{Z value to the subject}\times \text{angular resolution used when the image is captured})/\text{angular resolution at the time of training} \quad (7)$$

Figure 7:
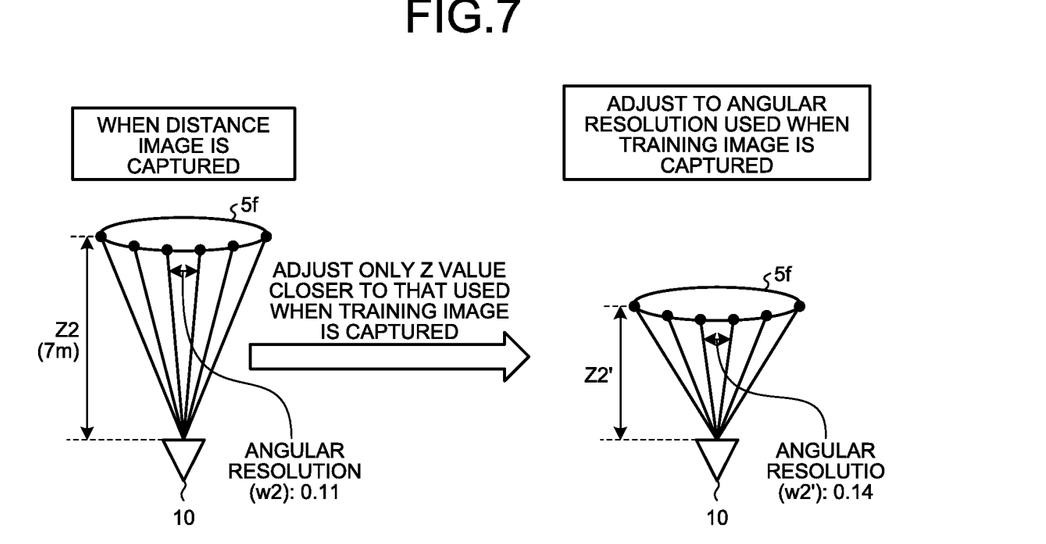
FIG. 7 is a schematic illustrating an example of a Z value correction.

FIG. 7 is a schematic illustrating an example of the Z value correction. In FIG. 7, it is assumed that, at the time of training, a Z value from the distance sensor 10 to the subject, Z1, is 5 meters, a first angular resolution in the width direction, w1, is 0.14, and a first angular resolution in the height direction, h1, is 0.12, and, at the time when the image is captured, a Z value from the distance sensor 10 to the subject (person 5*f*), Z2, is 7 meters, a second angular resolution in the width direction, w2, is 0.11, and a second angular resolution in the height direction, h2, is 0.12. As the Z value to the subject, it is possible to use the Z value at the center of gravity of the subject, or the average of the Z values to the subject, for example.

The correcting unit 132 then calculates (w2−w1) and (h2−h1). In the example illustrated in FIG. 7, (w2−w1)=(0.11−0.14)=−0.03, and (h2−h1)=(0.12−0.12)=0. The correcting unit 132 calculates a Z value for matching the second angular resolution w2 in the direction in which the absolute value of the difference is greater and the first angular resolution w1. The correcting unit 132 calculates Z2' that is the corrected Z value as 5500 millimeters=5.5 meters based on Equation (7). The correcting unit 132 calculates, as the amount by which the Z value is to be corrected, 7−5.5=1.5 meters in the approaching direction. The second angular resolution after the Z value correction in the other direction is obtained by multiplying the uncorrected second angular resolution in the other direction by a magnification ratio obtained by dividing the corrected second angular resolution in the direction in which the angular resolution has been matched, by the first angular resolution. In other words, because w2' is matched to 0.14, h2'=(0.14/0.11)×0.12=0.153. In the corrected distance image, the number of sampling points corresponding to the subject matches the number of sampling points at the time when the image is captured. After performing the Z value correction, the correcting unit 132 performs a coordinate conversion to convert the coordinate axes represented by x, y, and z into a distance image that represents the angular field and the distance.

In other words, the correcting unit 132 converts the distance information on the first distance image and the distance information on the second distance image into coordinate values. The correcting unit 132 then corrects the values in the coordinate axis along the direction extending from the sensor toward the subject in the second distance image, using the values in the coordinate axis along the direction extending from the sensor toward the subject in the first distance image as a reference.

For the distance image with the Z value correction applied, the correcting unit 132 determines whether the aspect ratio of the first angular resolution is different from that of the second angular resolution. If it is determined that the aspect ratio of the first angular resolution is the same as the aspect ratio of the second angular resolution, the correcting unit 132 outputs the distance image with the Z value correction applied to the generating unit 133.

If it is determined that the aspect ratio of the first angular resolution is different from that of the second angular resolution, the correcting unit 132 calculates the direction in which the distance image with the Z value correction applied is to be resized, and a magnification ratio. The correcting unit 132 resizes the distance image with the Z value correction applied, based on the calculated resized direction and magnification ratio. The correcting unit 132 then outputs the resized distance image to the generating unit 133.

Figure 8:
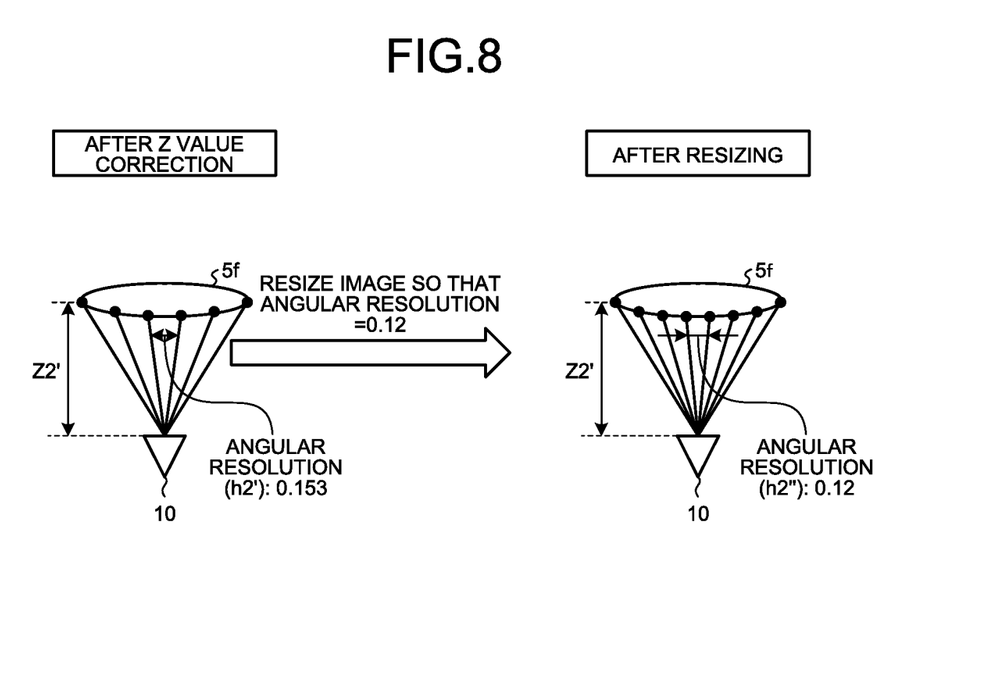
FIG. 8 is a schematic illustrating an example of resizing.

Resizing of the distance image with the Z value correction applied will now be explained with reference to FIG. 8. FIG. 8 is a schematic illustrating an example of resizing. As illustrated in FIG. 8, the second angular resolution h2' in the height direction of the distance image with the Z value correction applied is 0.153, while the first angular resolution h1 in the height direction used at the time of training is 0.12. By contrast, the second angular resolution w2' in the width direction of the distance image with the Z value correction applied is 0.14, and is the same as the first angular resolution w1 in the width direction used at the time of training. Therefore, the correcting unit 132 sets the height direction as the resizing direction, and calculates the magnification ratio as h2'/h1=0.153/0.12=1.275. The resized distance image has Z2' as the Z value, and 0.12 as a second angular resolution h2" in the height direction. In the resized distance image, the number of sampling points corresponding to the subject (person 5f) is increased. In other words, looking at the resized distance image as an image having the same pixel pitch, the resized distance image appears to be extended in the resized direction.

Figure 9:
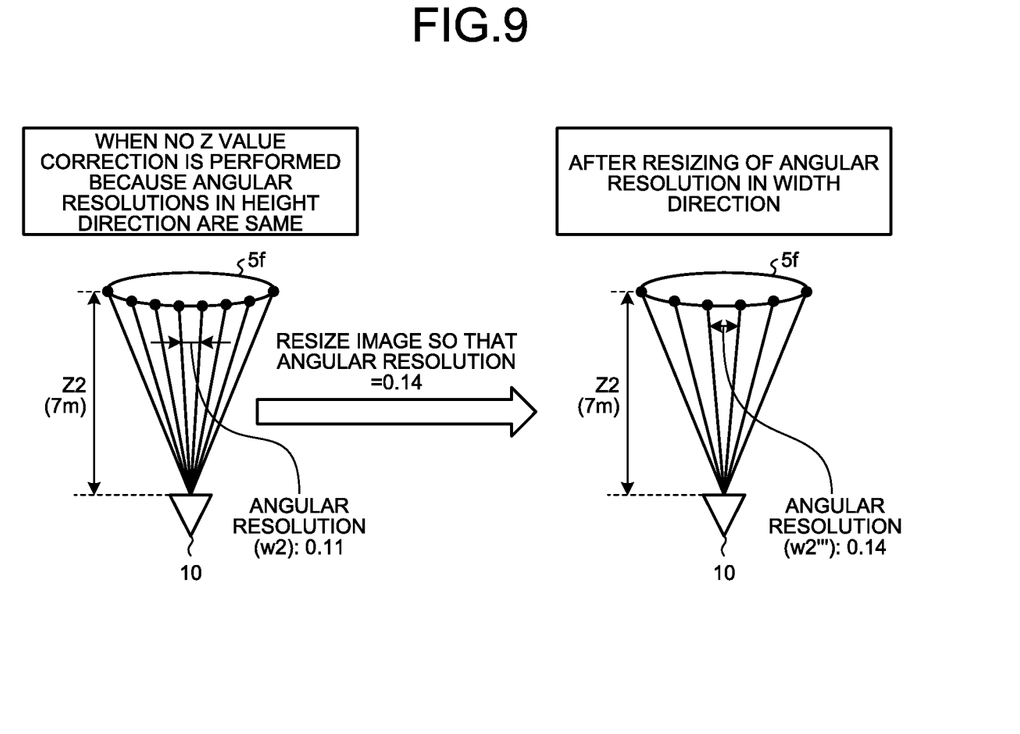
FIG. 9 is a schematic illustrating an example of resizing when the angular resolution in an inappropriate direction is corrected in the Z value correction.

Explained now with reference to FIG. 9 is a reason why the Z value is calculated in such a manner that the second angular resolution matches the first angular resolution of the training distance image, the second angular resolution being an angular resolution in the direction in which the absolute value of the difference (w2−w1), (h2−h1) is greater, in the Z value correction. It is assumed herein that the conditions of the training distance image and the acquired distance image are the same as those in the example illustrated in FIG. 7. FIG. 9 is a schematic illustrating an example of resizing when the angular resolution in an inappropriate direction is corrected in the Z value correction. Unlike FIG. 7, it is assumed, in FIG. 9, that calculated is a Z value for matching the second angular resolution to the first angular resolution of the training distance image, in the direction having smaller absolute value. In such a case, the correcting unit 132 does not perform the Z value correction because h2=h1.

If the resizing direction and the magnification ratio are calculated without performing the Z value correction, the correcting unit 132 acquires the width direction as the resizing direction, and the magnification ratio as 0.11/0.14=0.786. In the resized distance image, the second angular resolution in the width direction h2'''=0.14. However, because the magnification ratio is a value less than one, the number of sampling points corresponding to the subject (person 5f) in the distance image after the resizing becomes reduced. In other words, in the example illustrated in FIG. 9, because the resolution is reduced by applying a correction algorithm to the distance image in which the resolution is maintained as a result of causing the distance sensor 10 to control the angular field, the objective that is to recognize the parts of the subject can no longer be achieved in the environment different from those where training images are captured. Therefore, in the Z value correction, the second angular resolution needs to match the first angular resolution of the training distance image in the direction in which the absolute value of the difference (w2−w1), (h2−h1) is greater.

In other words, the correcting unit 132 corrects the acquired distance image based on the ratio between the first resolution corresponding to the angular field used when the training distance image is captured, and the second resolution corresponding to the acquired angular field, where the training distance image is a distance image with which the learning model used in the subject posture recognition process is trained. In other words, the correcting unit 132 corrects the second distance image based on a ratio between the first resolution that is based on the angular field used when the first distance image is captured, and the second resolution that is based on the angular field used when the second distance image is captured. The correcting unit 132 also corrects the second resolution in one of the directions, the one being one of the height direction and the width direction of the second distance image in which the difference between the first resolution and the second resolution is greater, in such a manner that the second resolution matches the first resolution in the direction in which the difference is greater. The correcting unit 132 also corrects the second distance image, when the aspect ratio of the first resolution is different from that of the second resolution, in such a manner that the aspect ratio of the second resolution becomes the same as the aspect ratio of the first resolution.

Returning to the explanation of FIG. 5, the generating unit 133 receives an input of one of the uncorrected distance image, the distance image with the Z value correction applied, and the resized distance image, from the correcting unit 132. Upon receiving the input of the one of these distance images, the generating unit 133 refers to the classifier storage unit 121, and generates a part-label image using a classifier, based on the input distance image. In other words, the generating unit 133 generates a part-label image in which the parts of the subject are represented by the part labels, using the corrected distance image and the learning model. The generating unit 133 then outputs the generated part-label image to the output control unit 134.

Figure 10:
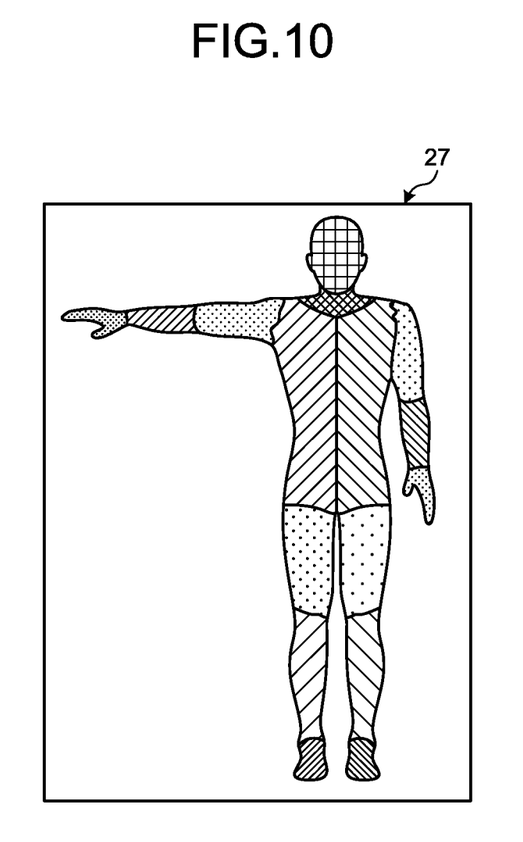
FIG. 10 is a schematic illustrating an example of a part-label image.

FIG. 10 is a schematic illustrating an example of a part-label image. As illustrated in FIG. 10, a part-label image 27 is an image in which the pixels representing the same part are indicated as the same part such as the right upper arm or the left thigh, based on the part labels for identifying the parts in units of a pixel in the distance image.

Returning to the explanation of FIG. 5, when the part-label image is received from the generating unit 133, the output control unit 134 generates the skeletal structure information representing the posture of the subject, based on the part labels assigned in the part-label image. The output control unit 134 extracts the pixels representing the border of a joint part, from the part-label image, for example. The output control unit 134 acquires the center of gravity of the extracted pixels representing the border of the joint part, and determines the coordinates of the center of gravity as the coordinates of the joint. In other words, the output control unit 134 determines three-dimensional positions of the skeletal structure of the person 5 that is a subject, and generates the skeletal structure information representing the posture of the subject. The output control unit 134 may acquire the distance image from the generating unit 133, and generates the skeletal structure information using the learning model in which the distance image stored in the classifier storage unit 121 is mapped to the information on the positions of the joints of persons.

The output control unit 134 refers to the skill DB 122, and recognizes a skill based on the skeletal structure information. The output control unit 134 acquires the score associated with the recognized skill. The output control unit 134 then outputs the recognized skill and score to the display unit 111, for example, and causes the display unit 111 to display the skill and the score.

The output control unit 134 may be configured to output the generated skeletal structure information to a processing unit or a processing device that performs fitting of the skeletal structure information to the distance image or the captured image captured by a camera, for example. In other words, the output control unit 134 may output the generated skeletal structure information in a manner usable as a skeletal model in a CG animation, for example. Furthermore, the output control unit 134 may process the generated skeletal structure information into a specific format, for example, and output the resultant information to an external storage device or the like not illustrated. The output control unit 134 may be configured to generate a three-dimensional model based on the generated skeletal structure information, and to output the model to the display unit 111 and cause the display unit 111 to display the model.

In other words, the output control unit 134 recognizes the skeletal structure of the subject based on the part labels assigned in the generated part-label image, and outputs the skeletal structure information representing the posture of the subject.

Figure 11:
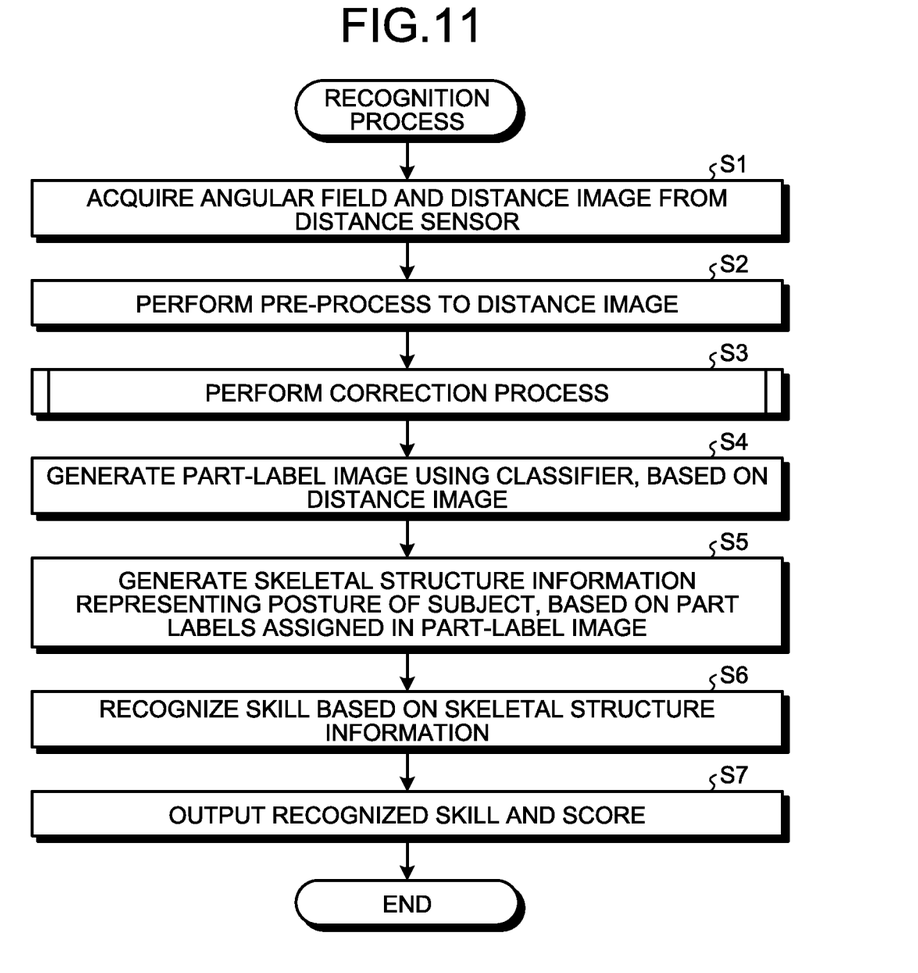
FIG. 11 is a flowchart illustrating an example of a recognition process according to the embodiment.

An operation of the recognition apparatus 100 in the posture recognition system 1 according to the embodiment will now be explained. FIG. 11 is a flowchart illustrating an example of a recognition process according to the embodiment.

The acquiring unit 131 in the recognition apparatus 100 receives and acquires an angular field and a distance image from the distance sensor 10 (Step S1). The acquiring unit 131 then outputs the acquired angular field and distance image to the correcting unit 132.

When the angular field and the distance image are received from the acquiring unit 131, the correcting unit 132 performs a pre-process to the distance image (Step S2). Once the pre-process of the distance image is completed, the correcting unit 132 performs the correction process (Step S3).

Figure 12:
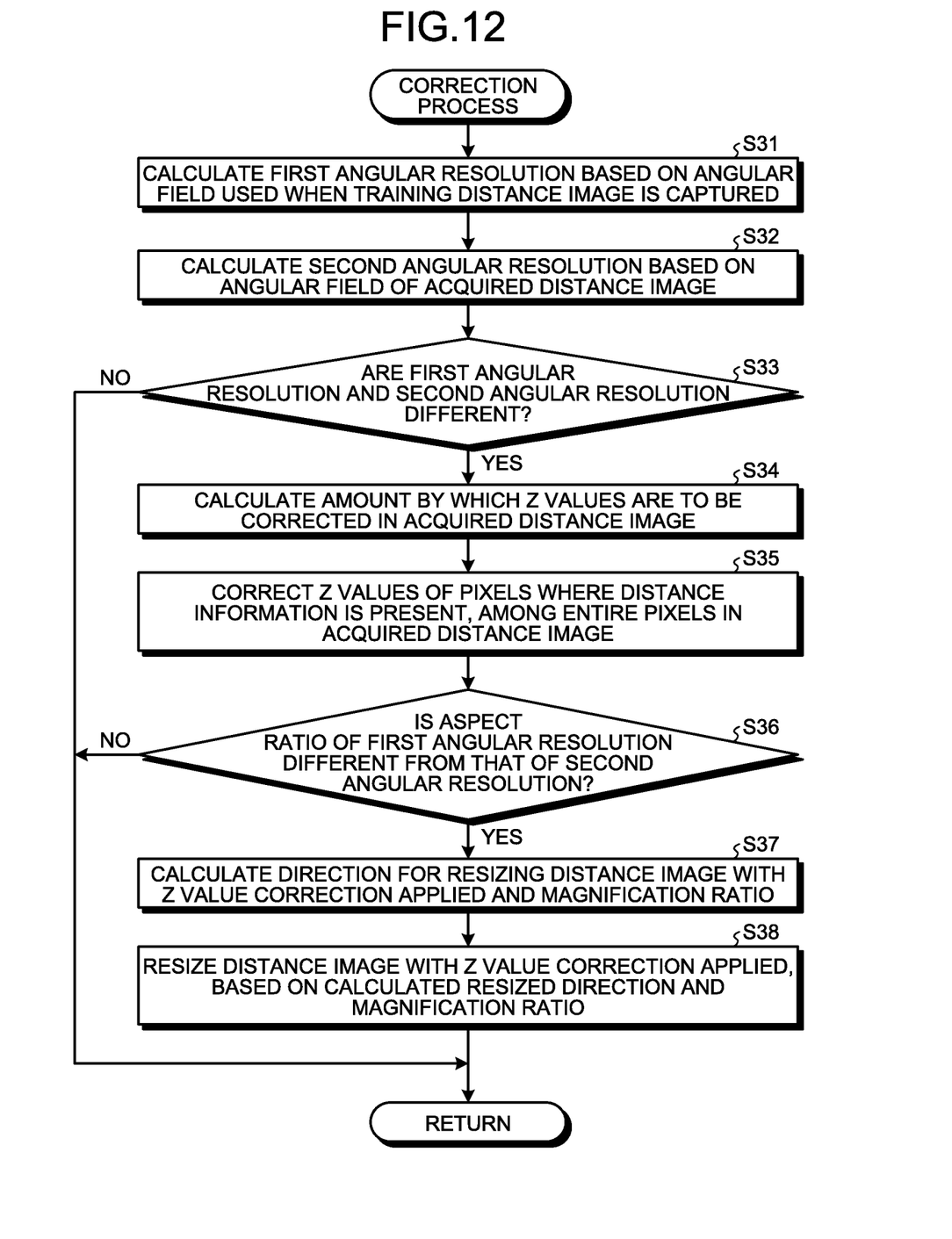
FIG. 12 is a flowchart illustrating an example of a correction process.

The correction process will now be explained with reference to FIG. 12. FIG. 12 is a flowchart illustrating an example of the correction process.

The correcting unit 132 refers to the classifier storage unit 121, and acquires the angular field used when the distance image for training the learning model is captured. The correcting unit 132 then calculates the first angular resolution based on the acquired angular field used when the training distance image is captured (Step S31). The correcting unit 132 also calculates the second angular resolution based on the angular field of the acquired distance image (Step S32).

The correcting unit 132 then determines whether the calculated first angular resolution and second angular resolution are different (Step S33). If it is determined that the first angular resolution and the second angular resolution match (No at Step S33), the correcting unit 132 outputs the distance image to the generating unit 133 without performing any correction, and shifts the control to the original process.

If it is determined that the first angular resolution and the second angular resolution are different (Yes at Step S33), the correcting unit 132 calculates the amount by which the Z value is to be corrected in the acquired distance image (Step S34). The correcting unit 132 corrects the Z value at the pixels where the distance information is present, by the calculated amount of correction, among the entire pixels in the acquired distance image (Step S35).

The correcting unit 132 then determines, for the distance image with the Z value correction applied, whether the aspect ratio of the first angular resolution is different from that of the second angular resolution (Step S36). If it is determined that the aspect ratio of the first angular resolution is the same as the second angular resolution (No at Step S36), the correcting unit 132 outputs the distance image with the Z value correction applied to the generating unit 133, and shifts the control to the original process.

If it is determined that the aspect ratio of the first angular resolution is different from that of the second angular resolution (Yes at Step S36), the correcting unit 132 calculates the direction for resizing the distance image with the Z value correction applied and the magnification ratio (Step S37). The correcting unit 132 then resizes the distance image with the Z value correction applied, based on the calculated resized direction and magnification ratio (Step S38). The correcting unit 132 then outputs the resized distance image to the generating unit 133, and shifts the control to the original process.

Returning to the explanation of FIG. 11, the generating unit 133 receives an input of one of the uncorrected distance image, the distance image with the Z value correction applied, and the resized distance image, from the correcting unit 132. Upon receiving the input of the one of these distance images, the generating unit 133 refers to the classifier storage unit 121, and generates a part-label image using a classifier, based on the input distance image (Step S4). The generating unit 133 then outputs the generated part-label image to the output control unit 134.

Upon receiving the part-label image from the generating unit 133, the output control unit 134 generates the skeletal structure information representing the posture of the subject, based on the part labels assigned in the part-label image (Step S5). The output control unit 134 then refers to the skill DB 122, and recognizes a skill, based on the skeletal structure information (Step S6). The output control unit 134 also acquires the score associated with the recognized skill. The output control unit 134 then outputs the recognized skill and score to the display unit 111, for example, and causes the display unit 111 to display the skill and the score (Step S7). In this manner, the recognition apparatus 100 can recognize the parts of the subject in an environment different from those where training images are captured. In other words, the recognition apparatus 100 can improve the accuracy of the recognition of the posture of a subject.

In the manner described above, the posture recognition system 1 includes the distance sensor 10 and the recognition apparatus 100. The distance sensor 10 captures a distance image including the information on the distance to the subject, at an angular field controlled based on the distance to the subject. The recognition apparatus 100 acquires the distance image and the angular field used when the distance sensor 10 captures the distance image, from the distance sensor 10. The recognition apparatus 100 corrects the acquired distance image based on the ratio between the first resolution corresponding to the angular field used when the training distance image is captured, and the second resolution corresponding to the acquired angular field, where the training distance image is a distance image with which the learning model used in the subject posture recognition process is trained. The recognition apparatus 100 generates a part-label image in which the parts of the subject are represented by the part labels, using the corrected distance image and the learning model. The recognition apparatus 100 recognizes the skeletal structure of the subject based on the part labels assigned in the generated part-label image, and outputs the skeletal structure information representing the posture of the subject. As a result, the posture recognition system 1 can recognize the parts of the subject in an environment different from those where training images are captured. In other words, the posture recognition system 1 can improve the accuracy at which the posture of a subject is recognized.

The recognition apparatus 100 also acquires the second distance image including information on the distance of the subject with respect to the distance sensor 10, the second distance image being an image to be subjected to the recognition process using a learning model, based on the first distance image and the angular field of the distance sensor 10 used when the second distance image is captured. Furthermore, the recognition apparatus 100 corrects the second distance image based on the ratio between the first resolution that is based on the angular field used when the first distance image is captured, and the second resolution that is based on the angular field used when the second distance image is captured. As a result, the recognition apparatus 100 can recognize the parts of the subject in an environment different from those where training images are captured.

The recognition apparatus 100 also generates a part-label image in which the parts of the subject are represented by the part labels, using the corrected second distance image and the learning model. The recognition apparatus 100 also recognizes the skeletal structure of the subject based on the part labels assigned in the generated part-label image, and outputs the skeletal structure information representing the posture of the subject. As a result, the recognition apparatus 100 can improve the accuracy at which the posture of the subject is recognized.

Furthermore, the recognition apparatus 100 converts the distance information on the first distance image, and the distance information on the second distance image, into the coordinate values. The recognition apparatus 100 also corrects the values in the coordinate axis extending in the direction from the distance sensor 10 to the subject in the second distance image, using the values in the coordinate axis extending in the direction from the distance sensor 10 to the subject in the first distance image as a reference. As a result, the recognition apparatus 100 can maintain the resolution of the captured distance image even if the angular resolution of the captured distance image is corrected to the same angular resolution as that of the training distance image.

Furthermore, the recognition apparatus 100 corrects the second resolution in one of the directions in which the difference between the first resolution and the second resolution is greater, the one being one of the height direction and the width direction of the second distance image, in such a manner that the second resolution matches the first resolution in the direction in which the difference is greater. As a result, the recognition apparatus 100 can maintain the resolution of the captured distance image.

If the aspect ratio of the first resolution is different from that of the second resolution, the recognition apparatus 100 corrects the second distance image in such a manner that the aspect ratio of the second resolution becomes the same as that of the first resolution. As a result, the recognition apparatus 100 can maintain the resolution of the captured distance image.

In the embodiment described above, the parts or the posture of the person 5 are recognized by collecting measurements of the person 5 performing gymnastics, but the embodiment is not limited thereto. For example, the embodiment may be applied to validate movements in other scored competitions such as figure skating, or in rehabilitations, to analyze forms in baseball, golfing, or free throws in basketball, or to instruct or assist new workers doing their jobs in factory production lines. An example of the ways in which the new workers are instructed and assisted includes displaying the difference between veterans and the new workers in their postures or the way in which they move their hands. As a method for displaying, a person making an exemplary movement may be displayed in a manner superimposed over or side by side with a person to be validated.

Furthermore, in the example explained in the embodiment above, the number of subjects is one, but the number is not limited thereto. For example, when there are a plurality of subjects, e.g., in a basketball game or women's rhythmic gymnastics group competition, the distance image may be captured by setting an angular field that covers all persons.

Furthermore, the elements of the units illustrated do not necessarily need to be physically configured in the way illustrated. In other words, the specific configurations in which the units are distributed or integrated are not limited to those illustrated, and all or some of the elements may be configured to be functionally or physically distributed or integrated into any units, depending on various loads or utilization conditions. For example, the generating unit 133 and the output control unit 134 may be integrated. Furthermore, the order of the processes illustrated are not limited to the order illustrated, and such processes may be executed simultaneously, or with their order swapped, within the scope in which such processes do not contradict one another.

Furthermore, various processing functions performed on the apparatus may be entirely or optionally executed by a CPU (or a micro-computer such as an MPU or a microcontroller unit (MCU)). It is needless to say that the various processing functions may be entirely or optionally executed by a computer program parsed and executed by a CPU (or a micro-computer such as an MPU or MCU), or by hardware such as a wired logic.

Figure 13:
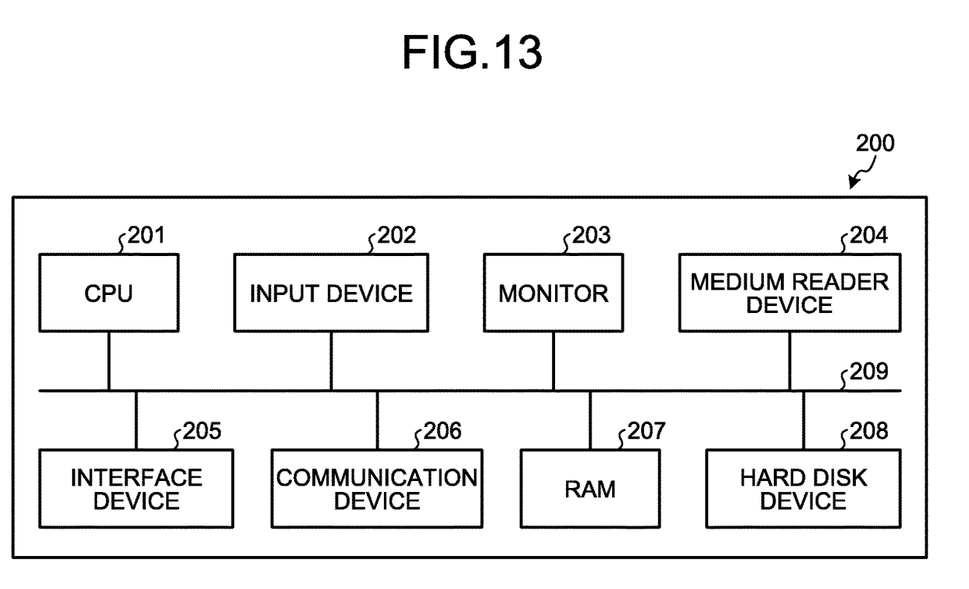
FIG. 13 is a schematic illustrating an example of a computer executing an image correction program.

The various processes explained in the embodiment described above may be implemented by causing a computer to execute a computer program created in advance. Therefore, an example of a computer executing a computer program having the same functions as those described in the embodiment will now be explained. FIG. 13 is a schematic illustrating an example of a computer executing an image correction program.

As illustrated in FIG. 13, a computer 200 includes a CPU 201 for executing various operations, an input device 202 for receiving data inputs, and a monitor 203. The computer 200 also includes a medium reader device 204 for reading a computer program or the like from a storage medium, an interface device 205 that is connected to various devices, and a communication device 206 for establishing a connection to the distance sensor 10 and to another information processing apparatus, over the wire or wirelessly. Furthermore, the computer 200 includes a RAM 207 temporarily stores therein various types of information, and a hard disk device 208. Furthermore, these devices 201 to 208 are connected to a bus 209.

The hard disk device 208 stores therein an image correction program having the same functions as those of the processing units that are the acquiring unit 131, the correcting unit 132, the generating unit 133, and the output control unit 134 illustrated in FIG. 5. The hard disk device 208 also stores therein the classifier storage unit 121, the skill DB 122, and various types of data for implementing the image correction program. The input device 202 receives inputs of various types of information such as operation information from a user of the computer 200, for example. The monitor 203 displays various screens such as a display screen to the user of the computer 200, for example. To the interface device 205, a printer is connected, for example. The communication device 206 has the same function as the communicating unit 110 illustrated in FIG. 5, for example, is connected to the distance sensor 10 and another information processing apparatus, and exchanges various types of information with the distance sensor 10 or the information processing apparatus.

The CPU 201 performs various processes by reading computer programs stored in the hard disk device 208, loading the computer programs onto the RAM 207, and executing the computer program. Furthermore, the computer program can cause the computer 200 to function as the acquiring unit 131, the correcting unit 132, the generating unit 133, and the output control unit 134, illustrated in FIG. 5.

The image correction program described above does not necessarily need to be stored in the hard disk device 208. For example, the computer 200 may be configured to read a computer program from a storage medium that is readable by the computer 200, and to execute the computer program. Examples of the storage medium readable by the computer 200 include a portable recording medium such as a compact disc read-only memory (CD-ROM), a digital versatile disc (DVD), or a universal serial bus (USB) memory, a semiconductor memory such as a flash memory, and a hard disk drive. Furthermore, it is also possible to store the image correction program in an apparatus connected to a public circuit, the Internet, or a local area network (LAN), and to cause the computer 200 to read the image correction program therefrom and to execute the image correction program.

Even with a distance image captured in an environment different from those where training images are captured, the parts of a subject can be recognized.

All examples and conditional language provided herein are intended for the pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A posture recognition system comprising a sensor and a recognition apparatus, wherein
the sensor captures a distance image including information on a distance to a subject, at an angular field controlled based on the distance to the subject, and
the recognition apparatus includes:
a memory; and
a processor coupled to the memory and configured to:
acquire the distance image and the angular field used when the sensor captures the distance image, from the sensor,
correct the acquired distance image based on a ratio between a first resolution corresponding to another angular field used when a training distance image is captured, and a second resolution corresponding to the acquired angular field, the training distance image being used for generating a learning model which recognizes a posture of the subject,
generate a part-label image in which parts of the subject are represented by part labels, using the corrected distance image and the learning model,
recognize a skeletal structure of the subject based on the part labels in the generated part-label image, and
output skeletal structure information representing a posture of the subject based on the skeletal structure.

2. A non-transitory computer-readable recording medium storing therein an image correction program that causes a computer to execute a process, the process comprising:
acquiring a second distance image containing information on a distance from a sensor to a subject, and to be subjected to a recognition process using a learning model that is based on a first distance image, and acquiring an angular field used when the sensor captures the second distance image; and
correcting the second distance image based on a ratio between a first resolution that is based on an angular field used when the first distance image is captured, and a second resolution that is based on the angular field used when the second distance image is captured.

3. The non-transitory computer-readable recording medium according to claim 2, wherein
the process further includes:
generating a part-label image in which parts of the subject are represented by part labels, using the corrected second distance image and the learning model,
recognizing a skeletal structure of the subject based on the part labels in the generated part-label image, and
outputting skeletal structure information indicating a posture of the subject based on the skeletal structure.

4. The non-transitory computer-readable recording medium according to claim 2, wherein the correcting includes converting distance information in the first distance image and distance information in the second distance image into coordinate values, and correcting a value along a coordinate axis in a direction extending from the sensor to the subject in the second distance image, using the value along the coordinate axis in the direction extending from the sensor to the subject in the first distance image as a reference.

5. The non-transitory computer-readable recording medium according to claim 4, wherein the correcting is performed in such a manner that the second resolution in one of a height direction and a width direction of the second distance image, the one being a direction in which a difference between the first resolution and the second resolution is greater, matches the first resolution in the direction in which the difference is greater.

6. The non-transitory computer-readable recording medium according to claim 4, wherein, at the correcting, when an aspect ratio of the first resolution is different from an aspect ratio of the second resolution, the second distance image is corrected in such a manner that the aspect ratio of the second resolution matches the aspect ratio of the first resolution.

7. An image correction method executed by a processor, the image correction method comprising:
acquiring a second distance image containing information on a distance from a sensor to a subject, and to be subjected to a recognition process, using a learning model that is based on a first distance image, and acquiring an angular field used when the sensor captures the second distance image; and
correcting the second distance image based on a ratio between a first resolution that is based on an angular field used when the first distance image is captured, and a second resolution that is based on the angular field used when the second distance image is captured.

8. The image correction method according to claim 7, further including:
generating a part-label image in which parts of the subject are represented by part labels, using the corrected second distance image and the learning model,
recognizing a skeletal structure of the subject based on the part labels in the generated part-label image, and
outputting skeletal structure information indicating a posture of the subject based on the skeletal structure.

9. The image correction method according to claim 7, wherein the correcting includes converting distance information in the first distance image and distance information in the second distance image into coordinate values, and correcting a value along a coordinate axis in a direction extending from the sensor to the subject in the second distance image, using the value along the coordinate axis in the direction extending from the sensor to the subject in the first distance image as a reference.

10. The image correction method according to claim 9, wherein the correcting is performed in such a manner that the second resolution in one of a height direction and a width direction of the second distance image, the one being a direction in which a difference between the first resolution and the second resolution is greater, matches the first resolution in the direction in which the difference is greater.

11. The image correction method according to claim 9, wherein, at the correcting, when an aspect ratio of the first resolution is different from an aspect ratio of the second resolution, the second distance image is corrected in such a manner that the aspect ratio of the second resolution matches the aspect ratio of the first resolution.

* * * * *